Patented Nov. 19, 1929

1,736,660

UNITED STATES PATENT OFFICE

THOMAS AUSTIN MITCHELL, OF DENVER, COLORADO, ASSIGNOR TO LAFAYETTE M. HUGHES, OF DENVER, COLORADO

METHOD OF CHLORINATING ORES

No Drawing.    Application filed October 11, 1926. Serial No. 141,024.

This invention relates to the treatment of metallurgical ores for recovering valuable products therefrom, and more particularly to a method of chlorinating such ores.

Many of the valuable metals are commonly found in nature as sulfides, either alone, e. g. zinc sulfide, or with other metals, such as chalcopyrite, $CuFeS_2$. These are often difficult to recover because of the presence of impurities, and particularly when found as crystals of various compounds intertwined with one another and with such inert materials as quartz. These metal values exist not only as sulfides but as oxides, carbonates and sulfates, and often more than one type of salt is found in the same ore, as for example where surface oxidation of a sulfide ore has produced sulfates.

One method of treating such sulfide ores has involved chlorinating the ore with ferric or cupric chlorides, but their rates of attack on metal sulfides have been found to be slow and to involve complicated apparatus as well as inefficient and uneconomical methods.

It is the chief object of my invention to overcome the difficulties heretofore met in chlorinating such ores and to provide a simple, efficient and rapid method of converting metal values of an ore to chlorides and recovering the same.

With this and other objects in view as will be apparent to one skilled in the art, my invention resides in the combination of steps set forth in the following disclosure and covered by the claims appended hereto.

In the course of my experimentation, I have found that an ore metal sulfide may be converted efficiently to a chloride by a chlorinating agent in the presence of a solution of manganese chloride; and this may be readily accomplished by supplying chlorine to the bath containing the ore and in which there is manganous chloride, or an ingredient capable of forming it. In the presence of an excess of chlorine and the sulfide ore, the manganese chloride serves as a carrier of chlorine, or otherwise aids in the reaction. I have also found that the rate of conversion of metal sulfides to chlorides by such chlorinating reagents as ferric and cupric chloride is greatly increased if a small amount of manganese chloride is present in the bath. So powerful a reagent is the manganese chloride, in the presence of a source of chlorine, that it will readily attack a sulfide ore which ferric chloride is unable to convert to a chloride within a reasonable time. The manganese chloride need be used only in a dilute solution. The reaction between the metal sulfide of the ore, such as zinc sulfide, and the manganese chloride in the presence of chlorine is exothermic, and enough heat is evolved to maintain the bath at a comparatively high temperature, so that it is easy to keep the bath under its most efficient working conditions.

In accordance with this invention, I propose to treat a sulfide ore, directly and without preliminary chemical treatment, such as a roasting operation, by means of a chlorinating agent, such as chlorine, and an aqueous solution containing manganese chloride, either alone or with other chlorides of metals capable of reducing in valency and attacking the ore metal compounds. In order that the process may be continuous, I prefer to introduce the chlorine directly into the digestion tank and oxidize the manganese reagent in the presence of the ore. The chlorine may be introduced directly as a gas or it may be produced in the bath in a nascent condition from a suitable source of supply, such as calcium hypochlorite.

If the ore is a simple zinc or lead sulfide, the reaction takes place in accordance with the following equations:—

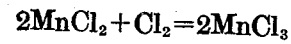

The more complex ores will react similarly.

Since many ores contain a manganese compound, the ore itself may, in such cases, serve as the source of the reagent. The manganese salt may be obtained from later stages in the recovery of the ore values and returned to the digestion tank. If the ore contains sulfides which are easily attacked by chlorine gas, I may convert some of these to chlorides preliminarily by a dry chlorination process, as by passing chlorine gas over the ore, wetted somewhat with water, as it passes through a rotating tube. This step converts some of the manganese compounds present in the ore to a chloride which is then available for the subsequent step of digesting the ore in an aqueous bath. For many chlorination processes, I may use manganese in some of its natural forms, such as pyrolusite, and mix the mineral directly with the ore to be treated.

Assuming the ore to be a simple sulfide of lead containing manganese sulfide as an impurity, I may proceed simply as follows. The ore is preferably ground to a fine size to hasten the attack of the reagent thereon, and it may be concentrated by the usual methods if desired. Concentration is however unnecessary and is not ordinarily used. The ore is then placed in an aqueous bath and chlorine gas passed through the mixture. It may also be chlorinated in a moist or substantially dry condition, to this end, and thereafter placed in an aqueous bath to dissolve the manganese chloride. Upon passing chlorine through the bath and in the presence of the manganese chloride, a rise in temperature in the bath is soon noted and it is found that the lead sulfide is being converted to lead chloride and free sulfur. It is probable that in the presence of an excess of chlorine and the sulfide ores the manganese chloride acts as a carrier of chlorine to the ore by passing through the transitory form of manganic or tri-chloride which attacks the metal sulfides of the ore more easily than does the chlorine gas introduced into the bath.

If the temperature of the solution gets too high, there is a danger of the sulfur becoming viscous or molten and coating the ore particles, thereby preventing their being attacked easily, or floating as a scum on the surface of the bath, or otherwise interfering with the chlorinating operaton. I have found that the best conditions are had if the bath is kept at a temperature which will prevent the sulfur from becoming a viscous mass, and preferably just below the boiling point of the chloride solution. This may be regulated by blowing hot or cold air through the bath, depending upon the amount of heat given off by the exothermic reaction of manganic chloride upon the ore metal sulfide.

It will be understood that the chlorine may be obtained from a suitable source of supply and the surplus recovered after its passage through the digestion tank. The reactions during the chlorinating step produce a final solution containing the manganese salts and lead chloride, the latter being held in solution by maintaining the temperature of the bath high enough for that purpose. Sulfur, quartz and any other insoluble impurities go with the residue.

After filtering, the manganese salt in solution may be recovered by a suitable method. I prefer to add to the hot bath, either before or after its digestion has been completed, an ore metal oxide, in this case lead oxide, and pass chlorine gas into the solution. This results in the formation of a precipitate of manganese dioxide which may be recovered by filtering the hot solution. A portion may be treated with hydrochloric acid and returned to supplement the reagent in the digestion tank, as found in the particular batch of ore being treated, if more reagent is needed. It is to be noted that in the first stages of the process, the sulfide ore is converted to a metal chloride by the manganese chloride in the presence of chlorine in excess, but when it is desired to precipitate the manganese dioxide from the solution, the sulfide ore and residue are removed and the solution only is treated with chlorine in the presence of the metal oxide.

The remaining solution may then be cooled and lead chloride crystals precipitated therefrom. The lead chloride in solution may be removed by passing the solution over iron filings or by other suitable steps. The iron chloride thus formed may if desired be used to supplement the manganese chloride reagent in the digestion tank. This iron salt will also be thrown down by the lead oxide and chlorine as ferric hydroxide and thus separated with the manganese dioxide.

It will now be understood that complex ores may be treated similarly. If sulfates are present with the sulfides, a soluble chloride, such as sodium or calcium chloride, may be added with the manganese chloride. These react directly with the sulfates to form sodium or calcium sulfates and the ore metal chloride. The sodium or calcium salts may be recovered suitably. The insoluble calcium salts may be recovered suitably. The insoluble calcium sulfate goes with the ore residue and the soluble chlorides will remain after removing the ore metal values from the solution, and this solution may be returned, in whole or in part, for reuse.

Iron compounds, including the sulfate and carbonate, are common impurities in sulfide ores. The manganic chloride will attack these particular salts to some extent to form a chloride of iron. The ferric chloride thereby formed in the presence of chlorine gas will itself turn in and help chlorinate other ore metal sulfides, and the ferrous chloride will be regenerated by the chlorine to ferric chloride as it is formed. If desired, and it is often desirable, ferric chloride may be added to help chlorinate the ore. The iron salt in solution will ultimately be precipitated with the manganese dioxide, as above explained. Incidentally, a little preroasted ore will serve in place of the lead oxide to precipitate the iron compound, and the manganese may be thrown down in a second operation, with the residue of iron by means of the lead oxide and chlorine as stated. It should also be noted that manganese sulfide is commonly present with iron pyrites in sulfite ores, hence the chlorides of each may be suitably obtained directly from the ore itself, and all that is required for the process is chlorine gas.

It will therefore be understood that the above description of the process of treating a sulfide ore, as accomplished by manganic chloride alone, applies equally well to ferric and cupric chlorides and that similar reactions, generally speaking, take place between such chlorides and other metal sulfides of the ore. Hence, the scope of this invention is intended to cover not only manganic chloride alone as a reagent, but combinations of this salt with other chlorides of metals of double valency, such as iron and copper. In the normal practice of my invention a mixture of iron and manganese chlorides will be employed.

Having thus described my invention, what I claim as new and desire to secure by Letters Patent is:

1. The method of treating a metallurgical ore comprising the steps of treating the ore in an aqueous bath containing manganese chloride while continuously passing chlorine gas into the solution and thereby forming a chloride of an ore metal and free sulfur, and maintaining conditions in the bath which prevent the precipitation of a manganese compound during the chlorination treatment.

2. The method of treating a complex sulfide ore comprising the steps of chlorinating it with a solution containing a small amount of a manganese chloride and in the presence of chlorine gas, removing the residue and recovering metal values from the chloride solution.

3. The method of treating a metallurgical ore comprising the steps of continuously introducing the ore into a dilute solution of manganese chloride and maintaining an excess of chlorine and unattacked but chlorinatable ore values in the bath and thereby causing manganese chloride to remain in solution and serve as a carrier of chlorine to the ore metal values to form a chloride of the ore metal and free sulfur, and subsequently separating the solution from the residue and recovering values therefrom.

4. The method of treating a metallurgical sulfide ore comprising the steps of introducing the ore into a solution containing only a small amount of manganese chloride and continuously passing chlorine into the solution while maintaining an excess of unattacked but chlorinatable ore values and thereby forming a chloride of an ore metal while keeping the manganese in solution, and subsequently filtering the ore residue from the solution and precipitating a manganese compound therefrom.

5. The method of chlorinating a metallurgical sulfide ore comprising the steps of introducing the ore into an aqueous bath containing a small amount of manganese chloride and continuously passing chlorine gas into the solution to oxidize the manganese chloride to the higher form which then reacts with the ore values to form chlorides of the metals thereof and free sulfur, while controlling the temperature of the bath to hold it below the boiling point of the solution, and maintaining conditions in the bath which prevent precipitation of a manganese compound during the ore chlorination.

6. The method of treating a sulfide ore comprising the steps of treating it with a dilute solution of manganese chloride in the presence of an excess of the chlorine, filtering the residue from the solution and thereafter precipitating the manganese by treating the solution with chlorine in the presence of a metal oxide.

7. The method of treating a metallurgical ore comprising the steps of digesting the ore in an aqueous bath containing a small amount of manganese chloride and passing chlorine continuously into the solution to oxidize the manganese chloride and cause it to react with the ore metal values, while maintaining conditions which prevent precipitation of the manganese reagent, and subsequently separating the solution from the residue and treating it in the presence of chlorine with an oxide of a metal of the ore and thereby precipitating the manganese and leaving the ore values in solution for subsequent recovery.

8. The method of treating a complex sulfide ore comprising the steps of digesting it with a solution containing a manganese chloride and in the presence of chlorine gas, maintaining the temperature of the bath below the boiling point thereof and at a point where sulfur will not hinder the chlorinating operation, treating the chlorinated solution with a metal oxide capable of precipitating manganese therefrom and subsequently recovering values from the solution.

9. The method of treating a complex sulfide ore comprising the steps of chlorinating the ore in a solution containing manganese chloride and the chloride of another reagent metal capable of reducing in valency and of attacking the ore metal sulfides and continuously passing chlorine gas into the bath, while maintaining conditions which prevent precipitation of the reagents during the chlorinating treatment.

10. The method of recovering values from a complex sulfide ore comprising the steps of treating the ore in an aqueous bath containing a small amount of manganese chloride and a small amount of iron chloride while continuously passing chlorine gas into the solution to oxidize the reagents and cause them to attack the ore metal values, carrying on the reaction in the presence of an excess of the ore to prevent precipitation of the reagents during the chlorinating process, and subsequently separating the reagents from the solution by precipitation thereof.

11. The method of treating a metallurgical ore containing a manganese compound comprising the steps of chlorinating the ore to form manganese chloride and then digesting the ore in the presence of a solution containing said manganese chloride while passing chlorine gas continuously into the bath and maintaing an excess of the ore in the bath to prevent precipitation of the manganese reagent during the chlorination of the ore, and subsequently separating the reagent and the ore metal values.

12. The method of treating a complex sulfide ore containing a manganese compound comprising the steps of chlorinating the ore to produce manganese chloride, dissolving said chloride, thereafter treating the ore in an aqueous bath with a dilute solution of said manganese chloride while passing chlorine gas in excess into the bath to cause the manganese chloride to react with the ore and convert metal sulfides thereof to metal chlorides, and maintaining the temperature of the bath below the boiling point thereof.

13. The method of treating an ore containing sulfides of manganese and a valuable metal, comprising the steps of chlorinating the ore to form manganese chloride and digesting the ore in a solution of said chloride and in the presence of chlorine gas in excess to form a chloride of said metal, and subsequently precipitating an insoluble manganese compound from the solution by means of an oxide of an ore metal, in the presence of chlorine, and separating the insoluble material from the solution.

14. The method of treating lead sulfide comprising the steps of digesting the lead sulfide in a hot dilute solution of manganese chloride while passing chlorine gas into the solution and maintaining the temperature below the boiling point, then filtering the solution from the residue and precipitating the manganese reagent solution.

15. The method of treating a metallurgical ore containing lead sulfide comprising the steps of digesting the ore in a dilute solution of manganese chloride while passing chlorine gas into the solution, maintaining the solution hot but below the boiling point thereof, separating the residue from the solution, precipitating the manganese reagent from the hot solution, cooling the solution to precipitate lead chloride therefrom, and ultimately recovering the remainder of the lead salt in solution.

16. The method of chlorinating a metallurgical ore containing iron and other metal values comprising the steps of digesting the ore in a hot aqueous bath containing a small amount of manganese chloride and thereby forming iron chloride and chlorides of other metal values and subsequently separating the residue from the solution and precipitating the iron and manganese therefrom.

Signed at Denver, Colorado, this 4th day of October, 1926.

THOMAS AUSTIN MITCHELL.